J. CRANDELL.
Horse Hay Fork.
No. 44,788. Patented Oct. 25, 1864.
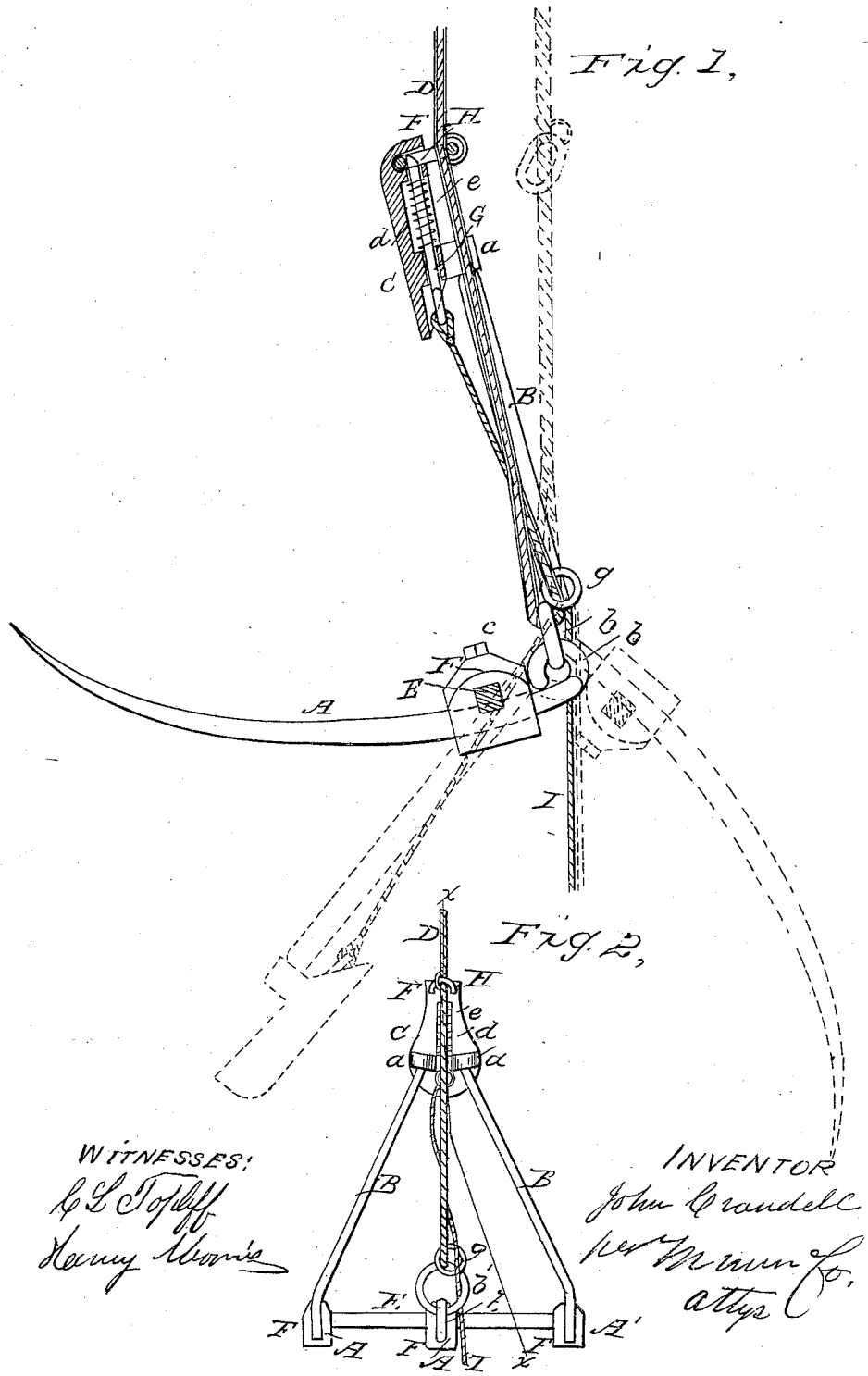

UNITED STATES PATENT OFFICE.

JOHN CRANDELL, OF ILION, NEW YORK.

IMPROVEMENT IN HORSE HAY-FORKS.

Specification forming part of Letters Patent No. 44,788, dated October 25, 1864.

*To all whom it may concern:*

Be it known that I, JOHN CRANDELL, of Ilion, in the county of Herkimer and State of New York, have invented a new and Improved Horse Hay-Fork; and I do hereby declare that the following is a full, clear, and exact description thereof, which will enable others skilled in the art to make and use the same, reference being had to the accompanying drawings, forming part of this specification, in which—

Figure 1 represents a side sectional view of my invention, taken in the line $x\,x$, Fig. 2; Fig. 2, a back view of the same.

Similar letters of reference indicate like parts.

This invention relates to a new and improved horse hay-fork for elevating hay in barns and depositing it in mows.

The object of the invention is to obtain a simple device for the purpose specified—one which may be cheaply constructed, be strong and durable, and operated or manipulated with the greatest facility.

A A′ A′ represent the tines of the fork, which are slightly curved, as usual, the two side tines, A′ A′, being prolonged so that they may be bent upward at the rear to form two bars, B B, which are inclined toward each other from their lower to their upper ends, as shown clearly in Fig. 2, the upper ends of the bars B B being secured by nuts or otherwise in eyes $a\,a$ at the rear side of a cast-iron head, C. The central tine, A, is not provided with one of these bars, and it extends back in line with the angles formed by the bars B and tines A′, and is bent to form an eye, $b$, in which a ring, $b'$, is fitted, to which the hoisting-rope D is secured. The three tines A A′ A′ are secured at the proper distance apart by means of a bar, E, which passes through collars F, fitted one on each tine, the bar being secured in said collars, and the latter secured on the tines by means of set-screws C. By this simple means the tines are firmly held in position and the fork rendered perfectly stiff and firm.

The head C is cast with a vertical central groove, $d$, in it rear side, in which a sliding bar, G, is fitted, having a spiral spring, $e$, upon it, which spring has a tendency to keep the bar G forced upward to its fullest extent, and through a recess, $f$, just above the groove $d$.

To the hoisting-rope D a ring, H, is attached, which, when the fork is in a working position, is within the recess $f$, the upper end of the bar G being in or through the ring, and shown in Fig. 1. The lower end of the bar has a cord, I, attached to it, said cord passing through a guide-ring, $g$, at the lower end of the hoisting-rope D.

From the above description it will be seen that the upper end of the fork is connected with the hoisting-rope by means of the ring H and the bar G in the head C, and when the fork and hoisting-rope are thus connected the former is in a working position, and may be hoisted, with its load, to the place where the latter is to be deposited.

The hoisting-rope D passes over pulleys placed one in the upper part of the barn and the other attached to the floor, the draft-animal being attached to the lower end of the rope. This, however, is the usual arrangement. When the fork is elevated to the desired spot the attendant or operator pulls the cord I, thereby drawing down the bar G, which causes the upper end of the fork to be liberated from the hoisting-rope D, and the fork will drop or tilt under its own gravity in connection with that of its load, as shown in red in Fig. 1, and the latter will be discharged. The empty fork is then made to descend by backing the horse, and the operator forces the tines into the hay on the cart or wagon, and then adjusts the ring H in the recess $f$, so that it will be caught by the bar G, and the fork is again elevated, with its load, as before.

It will be seen from the above description that the fork may be very economically constructed, and still be very strong and durable, there being no wood used, and in case a tine should break it may be readily replaced by a new one. The fork also, it will be seen, may be manipulated with the greatest facility, and tipped or dumped equally well in any position in which it may swing relatively with the operator.

I claim as new and desire to secure by Letters Patent—

A horse hay-fork constructed of the tines A A′ A′, secured together at the proper distance apart by means of the collars F, bar E, and set-screws $c$, with two of the tines, A′ A′, formed with bars B at the rear, bent or curved upward and connected to a head, C, substantially as set forth.

JOHN CRANDELL.

Witnesses:
W. H. THOMAS,
WM. KITZMILLER.